(12) United States Patent
Walker

(10) Patent No.: US 7,383,506 B2
(45) Date of Patent: Jun. 3, 2008

(54) RENDERING WITH GPU DURING SCREEN SAVER ACTIVATION

(75) Inventor: Brian J. Walker, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 11/170,958

(22) Filed: Jun. 30, 2005

(65) Prior Publication Data

US 2007/0006102 A1 Jan. 4, 2007

(51) Int. Cl.
*G06F 3/00* (2006.01)
*G06F 3/048* (2006.01)

(52) U.S. Cl. .................. 715/716; 715/764; 715/867
(58) Field of Classification Search .................. None
See application file for complete search history.

(56) References Cited

OTHER PUBLICATIONS

Impress Corporation. "Windows XP Video Screensaver Powertoy Configuration." Copyright Date: 2003; http://www.forest.impress.co.jp/article/2003/04/23/creativityfunpacks_2r.html.*
Savill, John. "What's the Windows XP PowerToys Fun Pack?" Copyright Date:Apr. 28, 2003; http://www.windowsitpro.com/articles/print.cfm?articleid=38801.*

* cited by examiner

*Primary Examiner*—Doug Hutton
*Assistant Examiner*—Soumya Dasgupta
(74) *Attorney, Agent, or Firm*—Senniger Powers LLP

(57) ABSTRACT

Pausing a graphic processing operation in order to continue processing a thread on a different desktop. When a graphic processing unit (GPU) is lost when a screen saver desktop is activated, the buffer containing the video frame that is currently being processed is discarded and a device is attempted to be created on the screen saver desktop which enables continued graphic processing.

19 Claims, 2 Drawing Sheets

RENDERING WITH GPU DURING SCREEN SAVER ACTIVATION

BACKGROUND

Rendering effects on video frames of video files requires considerable processing resources from a computer's graphics processing unit (GPU). The rendering process often takes the computer significant time to complete. Thus, it is common for people conducting the video editing to leave the computer unattended while it executes the video rendering processes.

A computer contains several desktops when it is operating. The active desktop is the desktop that is displayed to a screen. The active desktop may be a working desktop upon which a computer operator actively inputs data, such as a desktop containing a word processing application, a screen saver desktop, a security desktop, and so forth. A screen saver desktop is desktop that becomes the active desktop when a computer doesn't provide an input signal, such as a keystroke or a movement of the mouse, to the computer for a period of time. The screen saver desktop may display a variety of images to the screen which sometimes require the operation of a graphics application in the background. The screen saver may also password protect the computer, requiring a user to enter a password before the screen saver desktop is replaced with the working desktop. Another desktop is a security desktop in which a computer operator actively locks the computer from unauthorized use. In order to gain access to a locked computed, a computer operator must first enter a password on the security desktop screen.

When computer operators perform video editing, it is common for them to leave the computer unattended while the computer performs rendering processes. While unattended, the computer will activate a screen saver desktop which may or may not require a password for clearing the screen saver. It is often the expectation of computer operators performing graphical editing processes that the graphical rendering processes being conducted by the computer will continue in the background when the screen saver is activated. However, the activation of screen saver desktops of prior systems can cause computer access to the GPU to cease, thereby preventing video rendering processes to continue. Thus, when an operator returns to the computer, the rendering process has not progressed toward completion as expected, but is stalled at the point when the screen saver desktop was activated.

SUMMARY

Embodiments of the invention overcome the deficiencies of the known art when a computer's access to the GPU (hereinafter referred to as "a device") is lost when a screen saver desktop is activated. In one aspect of the invention, a graphic processing operation is paused until a device (i.e., the computer's access to the GPU) can be created on a different desktop. When a screen saver desktop is activated causing a device to be lost, the buffer containing the video frame that was being processed is discarded. A device is created on the active desktop to enable continued graphic processing.

Another aspect of the invention repeatedly pause or stall computer processing for a specified period of time, after which an attempt is made to create a device on the active desktop. This process is continued until a device is created on an active desktop.

In still another aspect, embodiments of the invention determine if a device may be created on default screen saver desktop before initiating rendering of a video file. If a device would not be able to be created on the default screen saver desktop, the default screen saver desktop is replaced with a replacement screen saver desktop upon which a device can be created.

Alternatively, the invention may comprise various other methods and apparatuses.

Other features will be in part apparent and in part pointed out hereinafter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
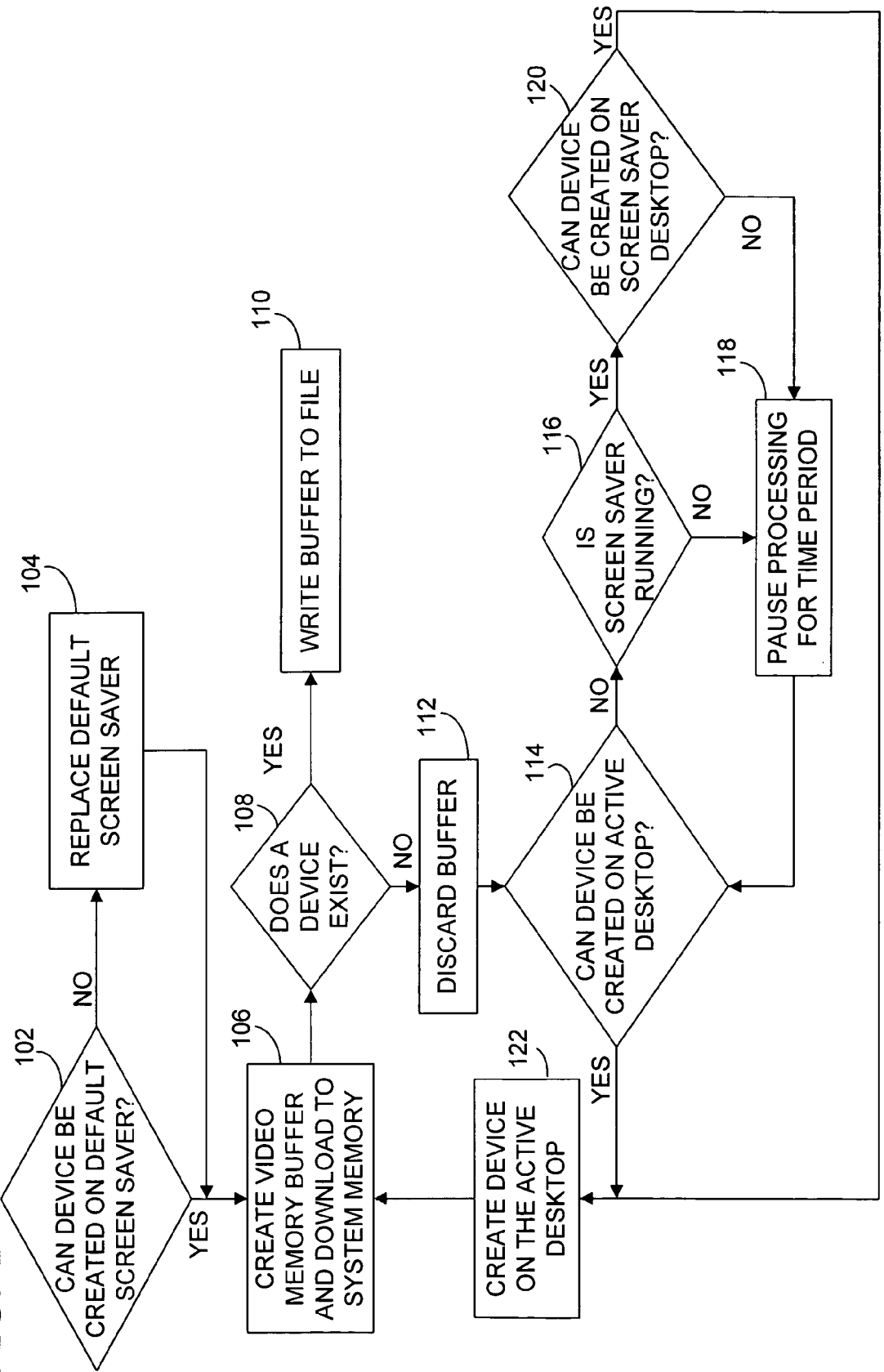
FIG. 1 is an exemplary flowchart of a method of rendering video files with a GPU during screen saver activation.

Referring first to FIG. 1, an exemplary flowchart is provided of a method of rendering video files with a GPU during screen saver activation. The method is initiated when a determination is made at 102 if the default screen saver would prevent a device from being created on the default screen saver desktop if it becomes the active desktop. For example, when the default screen saver requires a GPU to run the screen saver, a device would not be able to be created while the screen saver desktop is the active desktop. An example of such a screen saver would be a screen saver that utilizes Direct3D™ (Microsoft Corporation, Redmond, Wash.) during activation of the screen saver.

If the default screen saver requires GPU processing to run the screen saver, the default screen saver is replaced with a replacement screen saver at 104 that does not require GPU processing resources in order to execute. In one embodiment, the replacement screen saver is a screen saver that does not utilize Direct3D™ during its execution.

video memory buffer is created and the buffer is downloaded to system memory at 106. A determination is made at 108 whether a device exists. If a device exists, the buffer is written to file at 110.

If a determination is made that a device does not exist, the video memory buffer that is being used during the current rendering of a video frame is discarded at 112. Discarding the buffer that is used to store the video frame that was being rendered when the device was lost is necessary since the buffer may have been corrupted when the device was lost.

At 114, a determination is made whether a new device can be created on the active desktop. The new device is created on the desktop at 122 when it is determined that the new device can be created on the active desktop. After the new device is created, a video memory buffer is created, rendered, and downloaded to system memory at 106.

If a new device cannot be created at 114, a determination is made whether a screen saver desktop is the active desktop at 116. If a screen saver desktop is not the active desktop, processing is paused or stalled for a specified time at 118 when the new device cannot be a created on the active desktop. The new device is created on the desktop at 122 after pausing and when the new device can be created on the active desktop. After the new device is created, a video memory buffer is created, rendered, and downloaded to system memory at 106.

In one embodiment, the active desktop is a security desktop wherein the computer is locked, access to the computer is password-protected, and a device cannot be created until the correct password is entered. After the time period has lapsed, a determination is made whether a device can be created on the active desktop at 114.

If at 116 it is determined that the screen saver desktop is the active desktop, a determination is made whether a new device can be created on the active screen saver desktop at 120. Processing is paused or stalled for a specified time at 118 when the new device cannot be a created on the active screen saver desktop.

However, if at 120 it is determined that a new device can be created on the active screen saver desktop, the new device is created on the active desktop at 122. After the new device is created, a video memory buffer is created, rendered, and downloaded to system memory at 106.

Direct3D™ (Microsoft Corporation, Redmond, Wash.) is a video processing API (application programming interface) which allows applications direct access to the GPU and video memory buffers.

DShow™ (Microsoft Corporation, Redmond, Wash.) is a video processing API that allows the decoding and encoding of video files to/from memory buffers.

In one embodiment, a determination is made whether device can be created on a default screen saver desktop of a computer before GPU rendering of a video file is initiated. If the default screen saver desktop would not allow a device to be created on it, the default screen saver desktop is replaced with a replacement screen saver desktop upon which a device can be created.

In another embodiment, a device is created on an active screen saver desktop. After the device is created, GPU rendering of a video file is resumed.

In another embodiment, the rendering of a video frame is paused without using the pause function of the video editing software, for example, without using the pause function of DShow™. Using the DShow™ pause function can result in losing video buffers and causing corruption of the rendered video file. The pausing method of the invention, however, avoids the loss of video buffers. The rendering of the video frame is paused or stalled until a device is created on the active desktop. The method includes determining whether a device can be created on the active desktop. If a device cannot be created on the active desktop, the processing is paused, or placed in a sleep mode, for a specified period of time. After the time period has lapsed, a determination of whether a device can be created on the active desktop is repeated. The process of determining whether a device can be created on the active desktop and pausing the process for a specified time is repeated until a determination is made that a device can be created on the active desktop. Once a determination is made that a device can be created on the active desktop, a device is created on the active desktop and video rendering is resumed.

In one embodiment, the specified time period for pausing the process prior to repeating the determination whether a device can be created on the active desktop is up to one second. In another embodiment, the specified time period is up to two seconds.

Figure 2:
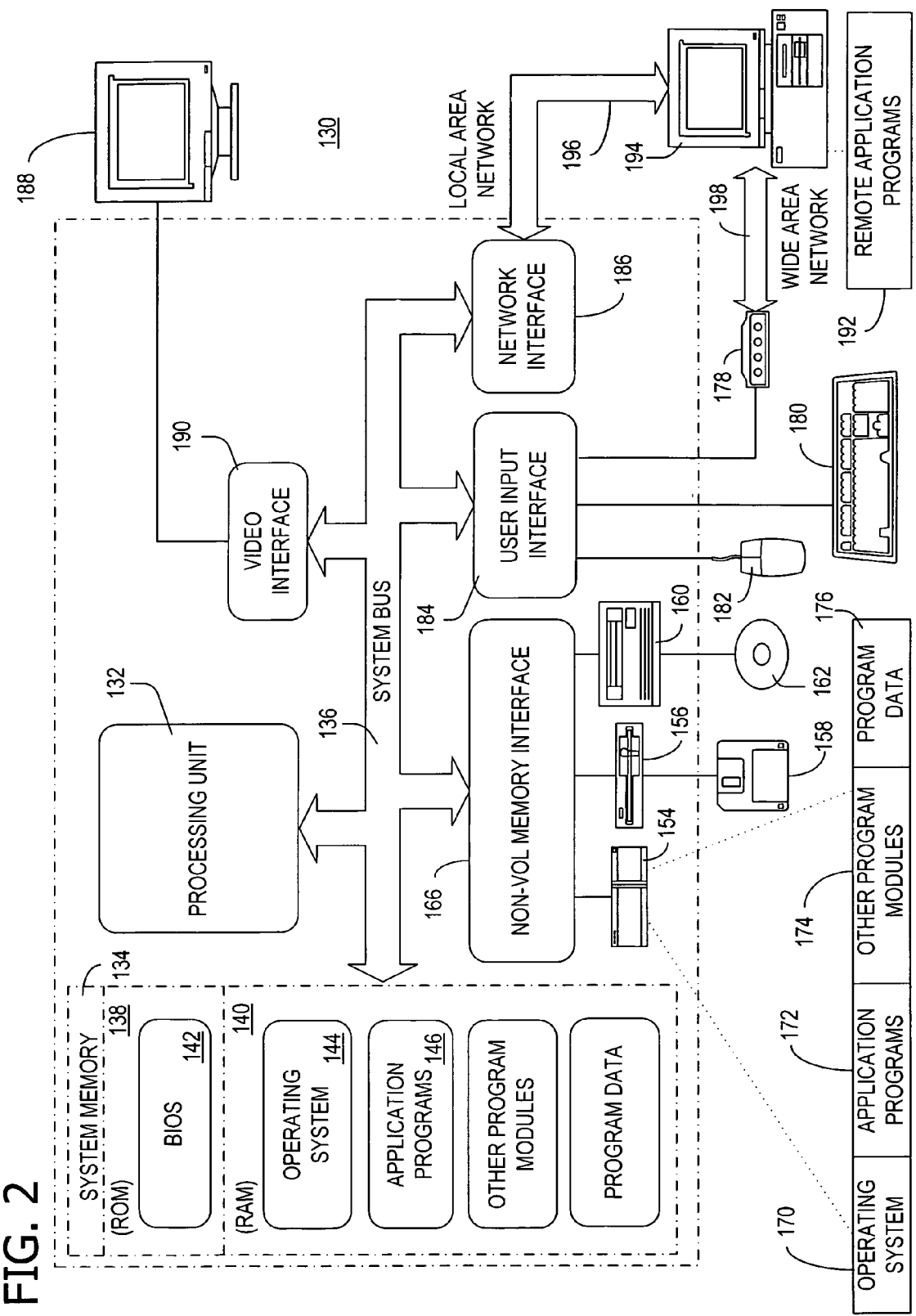
FIG. 2 is a block diagram illustrating one example of a suitable computing system environment in which the invention may be implemented. Corresponding reference characters indicate corresponding parts throughout the drawings.

FIG. 2 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 2 illustrates operating system 144, application programs 146, other program modules 148, and program data 150.

The computer 130 may also include other removable/non-removable, volatile/nonvolatile computer storage media. For example, FIG. 2 illustrates a hard disk drive 154 that reads from or writes to non-removable, nonvolatile magnetic media. FIG. 2 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 2, provide storage of computer readable instructions, data structures, program modules and other data for the computer 130. In FIG. 2, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 2 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown).

By way of example, and not limitation, FIG. 2 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The following examples further illustrate the invention.

EXAMPLE

Creating a Device on a Screen Saver Desktop

When creating a video file that uses the GPU to render its video effects, the device is lost when a screen saver kicks in or the system is locked. This is because the logon screen and screen saver run in a different desktop. A computer operator's typical expectation when leaving a computer unattended, is that the computer's screen saver will activate and password protect the system. They also expect that the lengthy GPU-assisted process of rendering video frames keeps running while the screen saver desktop is active.

In order for continued rendering of video frames of a video file to occur when a screen saver desktop is activated, a number of processes must take place. First, when the screen saver desktop becomes the active desktop, the device (the computer's access to the GPU) will be lost. When the device is lost the memory buffer containing the current video frame being rendered at the time the screen saver desktop is activated is discarded. The processing of the video file is then paused. The pause function of DShow™ (Microsoft Corporation, Redmond, Wash.) cannot be used as it can cause two main problems. First, some file writers will reset there file pointers when pause is called causing the file being created to become corrupt. Second, some file sources may skip frames when transitioning between run to pause to run states. Therefore, instead of DShow's pause function, a custom pause notion is created. When a computer is paused due to a lost device, our custom filter "FillBuffer" function will generate a loop wherein a new device is attempted to be created and pausing or sleeping for a specified time, until a device is successfully created. By not having the "FillBuffer" function call return, the graph's clock is kept from incrementing which has the effect of pausing the graph without calling DShow's pause function.

After the screen saver comes up the active desktop changes to the "screen-saver" desktop. To allow the GPU processing to run the "GPU" processing thread will be moved to the "screen-saver" desktop. After changing the threads desktop, a device associated with the screen saver "HWND" (i.e., handle to a window, a Windows® programming object) can be created if the screen saver doesn't use Direct3D™ (Microsoft Corporation, Redmond, Wash.).

If the current screen saver uses Direct3D™, a device cannot be created on the screen saver desktop while that screen saver is running. If this is the case, before that screen saver that uses Direct3D™ is launched, the screen saver is changed to a replacement screen saver that doesn't use Direct3D™. The replacement screen saver will then permit a device to be generated on the replacement screen saver desktop when it becomes the active desktop, thereby allowing GPU-assisted rendering of video files to continue.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A computer-implemented method for rendering a video file containing a plurality of video frames during activation of a screen saver desktop, wherein a first video frame of the video file is rendered via a first graphical processing unit (GPU) on a first desktop operating as the active desktop, the method comprising:
   determining that the first GPU is lost, said first GPU being lost when the screen saver desktop is activated for operating as the active desktop, wherein the first video frame of the video file is rendered for storage to a memory buffer when the first GPU is lost;
   in response to said determining, discarding the buffer for the first video frame being rendered; and
   creating a second GPU for resuming the rendering of the video file, said second GPU running on an activated replacement screen saver desktop.

2. The method of claim 1, further comprising:
   determining if the second GPU may be created on a default screen saver desktop before resuming the rendering of the video file; and
   replacing the default screen saver desktop with the replacement screen saver desktop upon which the second GPU can be created.

3. The method of claim 2, further comprising:
   creating the second GPU on the replacement screen saver desktop when the replacement screen saver desktop becomes the active desktop.

4. The method of claim 1, wherein until the second GPU is created on the replacement screen saver desktop, further comprising:
   pausing when the second GPU cannot be a created on the screen saver desktop; and
   creating the second GPU on the replacement screensaver desktop after pausing.

5. The method of claim 4, wherein the pausing lasts for up to one second.

6. The method of claim 4, after the second GPU has been created on the replacement screensaver desktop, further comprising:
creating a second buffer for storing a rendered third video frame.

7. The method of claim 6, further comprising:
writing the second buffer to file.

8. The method of claim 1, further comprising:
creating a second buffer for storing a rendered third video frame.

9. The method of claim 8, further comprising:
writing the second buffer to file.

10. The method of claim 1, wherein one or more computer-readable storage media have computer-executable instructions for performing the computer executable method of claim 1.

11. A system for rendering a video file containing a plurality of video frames, said system comprising a computer and a memory buffer, wherein a first video frame of the video file is rendered via a first graphical processing unit (GPU) on a first desktop operating as the active desktop on the computer, the computer being configured to execute the following steps:
determining that the first GPU is lost, said first GPU being lost when the screen saver desktop is activated for operating as the active desktop, wherein the first video frame of the video file is rendered for storage to a memory buffer when the first GPU is lost;
in response to said determining, discarding the buffer for the first video frame being rendered; and
creating a second GPU for resuming the rendering of the video file, said second GPU running on an activated replacement screen saver desktop.

12. The system of claim 11, wherein said computer is further configured to execute the following steps:
determining if the second GPU may be created on a default screen saver desktop before resuming the rendering of the video file; and
replacing the default screen saver desktop with the replacement screen saver desktop upon which the second GPU can be created.

13. The system of claim 12, wherein said computer is further configured to execute the following steps:
creating the second GPU on the replacement screen saver desktop when the replacement screen saver desktop becomes the active desktop.

14. The system of claim 11, wherein said computer is further configured to execute the following steps until the second GPU is created on the replacement screen saver desktop:
pausing when the second GPU cannot be a created on the screen saver desktop; and
creating the second GPU on the replacement screensaver desktop after pausing.

15. The system of claim 14, wherein the pausing lasts for up to one second.

16. One or more computer-readable storage media having computer-executable instructions for rendering a video file containing a plurality of video frames, wherein a first video frame of the video file is rendered via a first graphical processing unit (GPU) on a first desktop operating as the active desktop, comprising:
instructions for determining that the first GPU has been lost, said first GPU being lost when a screen saver desktop is activated for operating as the active desktop, wherein the first video frame of the video file is rendered for storage to a memory buffer when the first GPU is lost;
instructions for discarding the buffer for the first video frame being rendered in response to said determining; and
instructions for creating a second GPU for resuming the rendering of the video file, said second GPU running on an activated replacement screen saver desktop.

17. The computer-readable storage media of claim 16, further comprising:
instructions for determining if the second GPU may be created on a default screen saver desktop before resuming the rendering of the video file; and
instructions for replacing the default screen saver desktop with the replacement screen saver desktop upon which the second GPU can be created.

18. The computer-readable storage media of claim 16, further comprising instructions for repeating the following instructions until the second GPU is created on the replacement screen saver desktop:
instructions for pausing when the second GPU cannot be a created on the screen saver desktop; and
instructions for creating the second GPU on the replacement screensaver desktop after pausing.

19. The computer-readable storage media of claim 18, wherein the pausing lasts for up to one second.

* * * * *

UNITED STATES PATENT AND TRADEMARK OFFICE
CERTIFICATE OF CORRECTION

PATENT NO. : 7,383,506 B2  Page 1 of 1
APPLICATION NO. : 11/170958
DATED : June 3, 2008
INVENTOR(S) : Brian J. Walker It is certified that error appears in the above-identified patent and that said Letters Patent is hereby corrected as shown below:

IN THE SPECIFICATIONS:

In column 2, line 48, before "video" insert -- A --.

Signed and Sealed this
Nineteenth Day of April, 2011

David J. Kappos
*Director of the United States Patent and Trademark Office*